Dec. 23, 1924.　　　　　　　　　　　　　　　　　　1,520,069

E. MONTI

APPARATUS FOR EVAPORATING SOLUTIONS

Filed March 28, 1919

Inventor
Endo Monti
By
Attorneys

Patented Dec. 23, 1924.

1,520,069

UNITED STATES PATENT OFFICE.

EUDO MONTI, OF TURIN, ITALY.

APPARATUS FOR EVAPORATING SOLUTIONS.

Application filed March 28, 1919. Serial No. 285,907.

*To all whom it may concern:*

Be it known that I, EUDO MONTI, doctor of chemistry, subject of the King of Italy, residing at 20 Via Figlie dei Militari, Turin, Italy, have invented certain new and useful Improvements in Apparatus for Evaporating Solutions, of which the following is a specification.

The present invention relates to certain new and useful improvements in apparatus for making jams, jellies and marmalades of fruits, and especially of grapes. This application is a continuation, in part, of my copending application filed October 3, 1916, Serial No. 123,563. It is known that fruit jams, marmalades and jellies owe their consistency to the pectin contained in some fruits, such as apples, currants, gooseberries, bitter and sweet oranges, quinces and the like. Also some kinds of grapes, such as Concord, contain a considerable quantity of pectin, which will gelatinize when concentrated or mixed with a suitable quantity of sugar. It is known that the pectin contained in fruits and in sea weeds, (agar agar) and also animal glue, will lose their gelatinizing properties if boiled for a long time under atmospheric pressure. Therefore the usual process of making jellies consists in evaporating very quickly the juice containing the pectin in a small pan heated by steam at high pressure till the juice is thick enough to gelatinize as soon as a suitable quantity of sugar is added. During this violent ebullition all the flavour will evaporate; moreover, in contact with high pressure steam the vegetable albumin will curdle and not only the enzyms but also the salts and acids contained in fresh juice will be altered and all their beneficial properties be lost.

The object of the present invention is to provide an apparatus whereby jams, jellies and marmalades may be prepared, even of grapes, strawberries and other scented fruits, without impairing the gelatinizing power of the contained pectin, and without loss of the natural flavour and beneficial dietetic and therapeutical properties of the fruit.

Repeated experiments have taught me that the pectin contained in apples, pears, grapes, oranges, gooseberries, currants and other fruits can be extracted by reducing the fruit to finely divided or smashed condition and systematically exhausting the same with lukewarm water at a temperature more or less elevated, according to the kinds of fruits, and not exceeding 50° C. if the fruit is grapes. I have also ascertained that by concentrating the pectin thus extracted at a low temperature in vacuum by means of an apparatus acting continuously and automatically, I obtain concentrated solutions containing as high as 80° of dry extract, without losing any of the gelatinizing power of the pectin. Pectin prepared in this way is far superior to that of juice which is concentrated very quickly by steam under atmospheric pressure.

In the accompanying drawings I have shown diagrammatically an illustrative embodiment of the apparatus.

Figure 1:
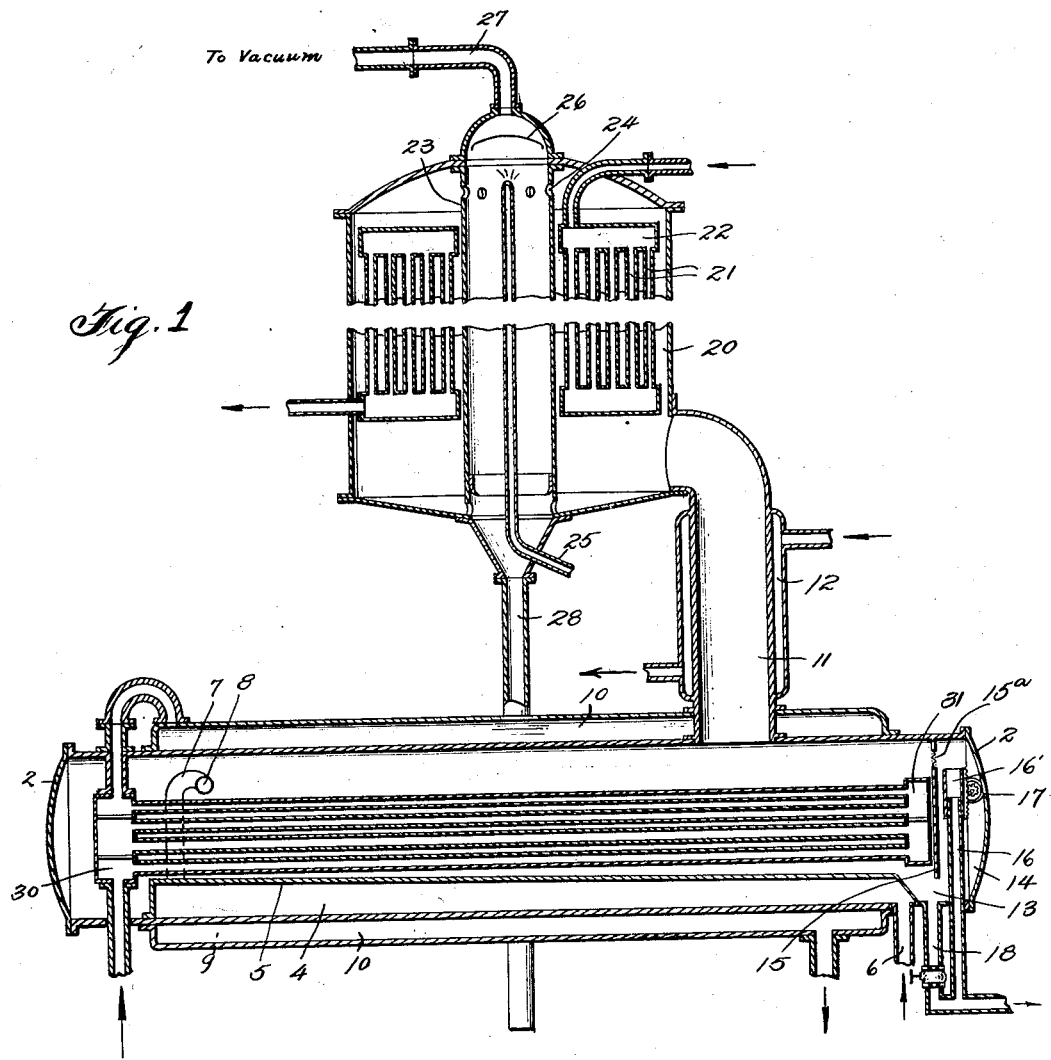
Figure 1 is an axial vertical section of the tubular evaporator with its condenser.
Figure 2:
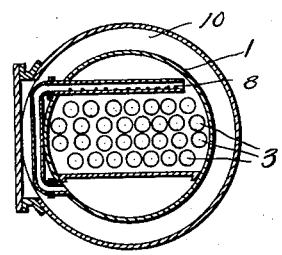
Figure 2 is a cross-section of the tubular evaporator.

The concentrator, or evaporator, consists of a cylinder 1, having both ends closed by hinged bottoms 2. In the lower part of the cylinder 1 is provided a free space 4 beneath that inclined partition 5 into which the solution to be concentrated is conveyed through the tube 6. In the cylinder 1 is arranged a bundle of tubes 3, in which the warm water circulates, said water being forced to flow in a tortuous and continuous path through all the tubes, owing to the arrangement of the headers 30 and 31. A jacket 9 is mounted on the cylinder 1 so as to leave a space where the warm water coming from the tubes circulates. The large tube 11 connects the evaporator to the condenser, and a still larger tube surrounding tube 11 forms an annular space 12 in which warm water is caused to circulate.

The ends of the cylinder 1, as well as the upper part of the tube 11, which are left uncovered, are preferably provided with peep holes in order that the working of the apparatus may be inspected.

The upper surface of inclined partition 5 terminates in a pool 13 which communicates near its bottom with the chamber 14 which is separated from the cylinder 11 by a vertical partition 15 extending nearly to the bottom of the cylinder.

The partition 15 is provided at the top with a net-covered opening 15ª, in order to stop the foam and equalize the pressure in both compartments.

In the compartment 14 is arranged an overflow pipe 16 for the concentrated solution. The telescoping end section 16' of said pipe can be adjusted vertically by means of a driving mechanism 17 actuated from without so as to regulate the discharge level.

The solution to be concentrated flows through a tube 6 to the lower compartment 4, where it is preliminarily heated by the water circulating in the space 10; it flows then through a tube 7 opening in a transverse tube 8, which is perforated so that the solution is sprayed on the bundle of tubes 3. The fluid is maintained, by means of the overflow pipe 16, at such a level that the tubes 3 are almost completely immersed.

The more concentrated solution collects at the bottom of the cylinder 1 and flows along the inclined partition 5 to the pool 13 and then into the compartment 14 (being prevented from getting mixed with the more diluted solution by the partition 15) and is discharged through overflow pipe 16 into a suitable collector. The evaporator is also provided with an auxiliary bottom outlet 18.

The condenser (shown at the top of Fig. 1) comprises a surface condenser and a mixing condenser forming a unit, the second condenser being arranged inside the first one. The vapours from the tube 11 pass into the cylinder 20, in which is arranged a bundle of vertical tubes 21, carried by annular collectors 22, in which the cold water circulates. At the centre is disposed the mixing condenser formed by a vertical cylinder 23 provided near its top with openings 24 through which pass any uncondensed vapours from the surface condenser. Inside said cylinder cold water arriving through the tube 25 is finely sprayed on the plate 26. The upper end of cylinder 23 in connected by means of the tube 27 with a vacuum pump (not shown), while the lower part ends preferably in a barometric pipe 28 or in a collector in which a vacuum is maintained. The plate 26 must be disposed and shaped in such a way as to prevent the suction acting so as to draw water through the tube 27. The water of the mixing condenser, as well as the condensation water of the surface and mixing condensers, is discharged through said tube 28.

The liquid to be concentrated (grape juice for example) is let into the tank to a depth which will partially immerse the heating coils, the desired level being constantly maintained by appropriate regulation of the height of the end section 16' of the over flow pipe. Warm water is circulated in the tubes 3, cooling water is supplied to the surface and mixing condensers and a vacuum is produced within the evaporator and condenser. The evaporation of the liquid thereupon ensues at a temperature which never rises above 50° C. if grape juice is being concentrated and not much above that temperature in a case of other fruit juices and liquids. As the evaporation progresses the more concentrated juice settles by reason of its greater specific gravity to the bottom of the tank and progresses along the inclined partition 5 to the pool 13, overflowing through pipe 16 into any suitable receiver. The vapor rising through the tube 11 in the condenser will be subjected to a preliminary condensation by the surface condenser, any vapors which pass the surface condenser being condensed by the mixing condenser, assisted by the barometric condenser (pipe 28). By means of this compound condenser I am enabled to reduce the difference between the temperature of the cooling water and the boiling temperature of the solution to from 5 to 10° C. as compared with the temperature difference in the usual mixing condenser which is frequently 30° and never less than 25° C.

An important feature of my invention resides in the means for abating foam, which consists in heating the upper surface of the evaporator and the tube 11 so that the bubbles of which the foam is composed will be burst by expansion of the gas within them. As shown in the drawings the foam abating means comprises heating jackets 9 and 12.

What I claim is:

1. An apparatus of the character described comprising a closed tank for a juice to be concentrated, means for reducing the pressure within said tank, means for heating said tank, said tank having a bottom inclined relative to the horizontal, an upright partition in said tank at the lower end of said inclined bottom and provided with an opening adjacent the latter and a screened opening adjacent the top of the tank, and a vertically adjustable overflow outlet separated from the main chamber of the tank by said partition.

2. In a concentrating evaporator a horizontal cylindrical shell, a wall dividing said shell into an upper and a lower horizontal chamber, heating elements disposed in the upper chamber, a conduit connecting said upper chamber with said lower chamber, means for introducing a liquid to be evaporated into said lower chamber, means for exhausting vapors and means for discharging concentrate from said upper chamber, a cylindrical jacket surrounding said shell and forming a heating chamber through which said conduit extends and a common means for introducing a heating fluid into said heating chamber and into said heating elements.

3. In a concentrating evaporator a horizontal cylindrical shell, a transversely horizontal and longitudinally inclined wall dividing said shell into an upper and a lower horizontal chamber, heating elements disposed in the upper chamber, a conduit connecting said upper chamber at a point above said elements with the lower chamber, means for introducing a liquid to be evaporated into said lower chamber, means for exhausting vapors and means for discharging concentrate from said upper chamber, a cylindrical jacket surrounding said shell and forming a heating chamber and means for introducing a heating fluid into said heating chamber and into said heating elements.

In testimony whereof the foregoing specification is signed in the presence of two witnesses.

EUDO MONTI.

Witnesses:
FRANCESCO PATRITO,
GUISEPPE DE LEE.